(12) United States Patent
Hanna et al.

(10) Patent No.: US 11,625,299 B1
(45) Date of Patent: Apr. 11, 2023

(54) INSERTING TEMPERATURE INFORMATION INTO A CODEWORD

(71) Applicant: Micron Technology, Inc., Boise, ID (US)

(72) Inventors: Stephen D. Hanna, Fort Collins, CO (US); Zhengang Chen, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/645,183

(22) Filed: Dec. 20, 2021

(51) Int. Cl.
*G06F 11/10* (2006.01)
(52) U.S. Cl.
CPC .............................. *G06F 11/1076* (2013.01)

(58) Field of Classification Search
CPC .................................................. G06F 11/1076
See application file for complete search history.

(56) References Cited

U.S. PATENT DOCUMENTS

| 10,249,349 B2 * | 4/2019 | Takizawa | G11C 16/26 |
| 2020/0142799 A1 * | 5/2020 | Hiruta | G06F 11/3037 |

* cited by examiner

*Primary Examiner* — Kyle Vallecillo
(74) *Attorney, Agent, or Firm* — Holland & Hart LLP

(57) ABSTRACT

Methods, systems, and devices for inserting temperature information into a codeword are described. A memory system may determine that a predetermined set of bits of a codeword has been received. Based on determining that the predetermine set of bits has been received, the memory system may replace bits of the codeword with temperature information that indicates a temperature of the memory system. The memory system may then store the codeword comprising the temperature information in a memory array.

19 Claims, 9 Drawing Sheets

INSERTING TEMPERATURE INFORMATION INTO A CODEWORD

FIELD OF TECHNOLOGY

The following relates generally to one or more systems for memory and more specifically to inserting temperature information into a codeword.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

A system, such as a memory system, may experience temperature variations that negatively impact the operations of the memory system. For example, a memory system that stores information at a first temperature (which may be referred to as the programming temperature) and then later reads the information at a second temperature (which may be referred to as the reading temperature) may experience errors in the information due to the difference between the two temperatures. Among other reasons, this occurs due to the differences in the conditions and the properties of the information stored and read (among other actions) at different times and different conditions.

According to the techniques described herein, a memory system may reduce errors due to temperature variation by inserting the programming temperature for a set of data into the set of data before writing the set of data to memory. For example, the memory system may receive a set of data with a set of bits, which may in some cases be a placeholder set of bits, and replace the placeholder set of bits with temperature information that indicates the programming temperature for the set of data. The temperature information may be used by a controller to adjust one or more parameters associated with the memory system, such as one or more trim settings of the memory system, if the controller determines that the set of data is unreliable (e.g., has a threshold quantity of errors). Thus, the memory system may help the controller compensate for variation between the programming temperature and the reading temperature for a set of data, which may improve the performance of the memory system and the accuracy of the set of data.

Figure 1:
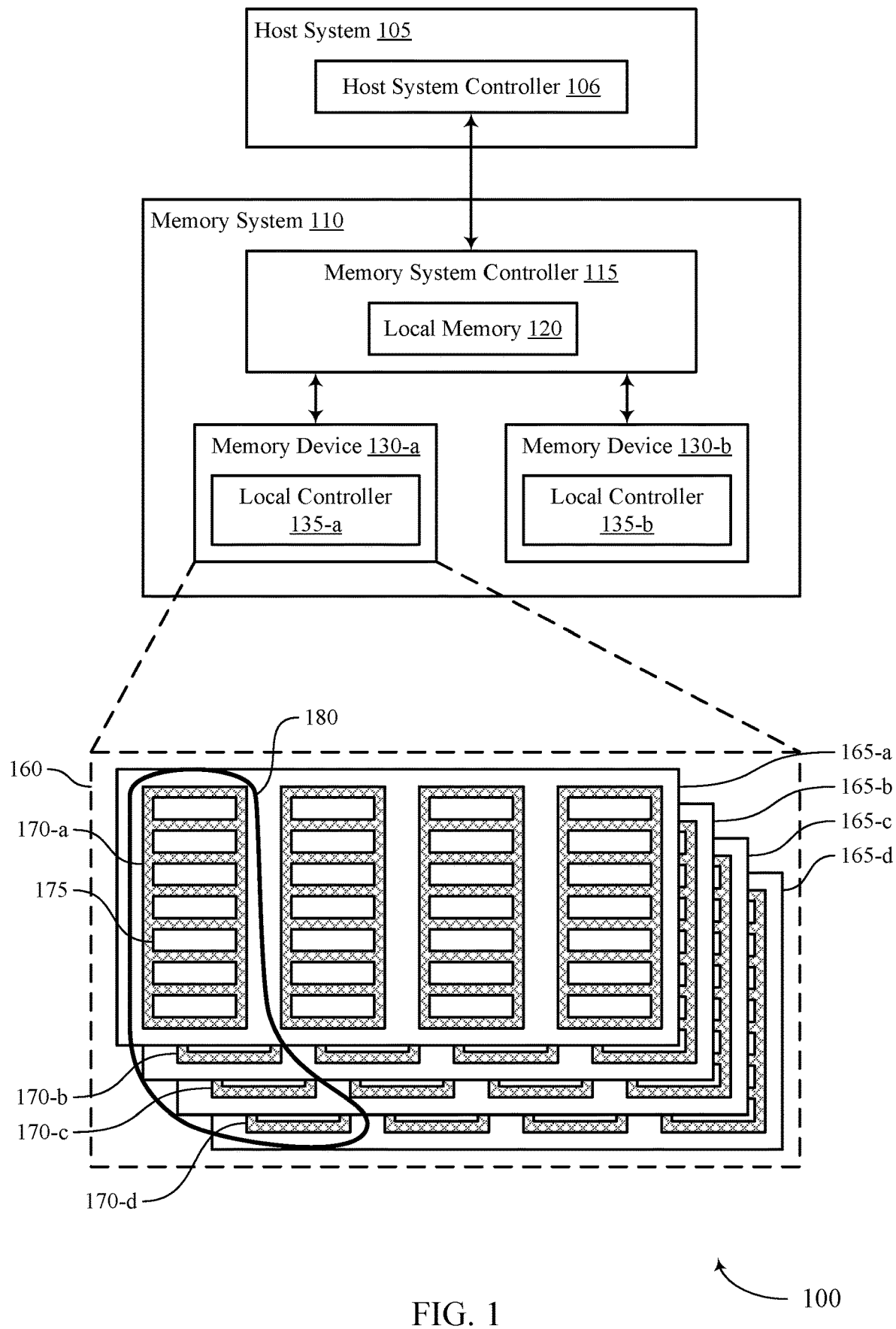
FIG. 1 illustrates an example of a system that supports inserting temperature information into a codeword in accordance with examples as disclosed herein.
Figure 2:
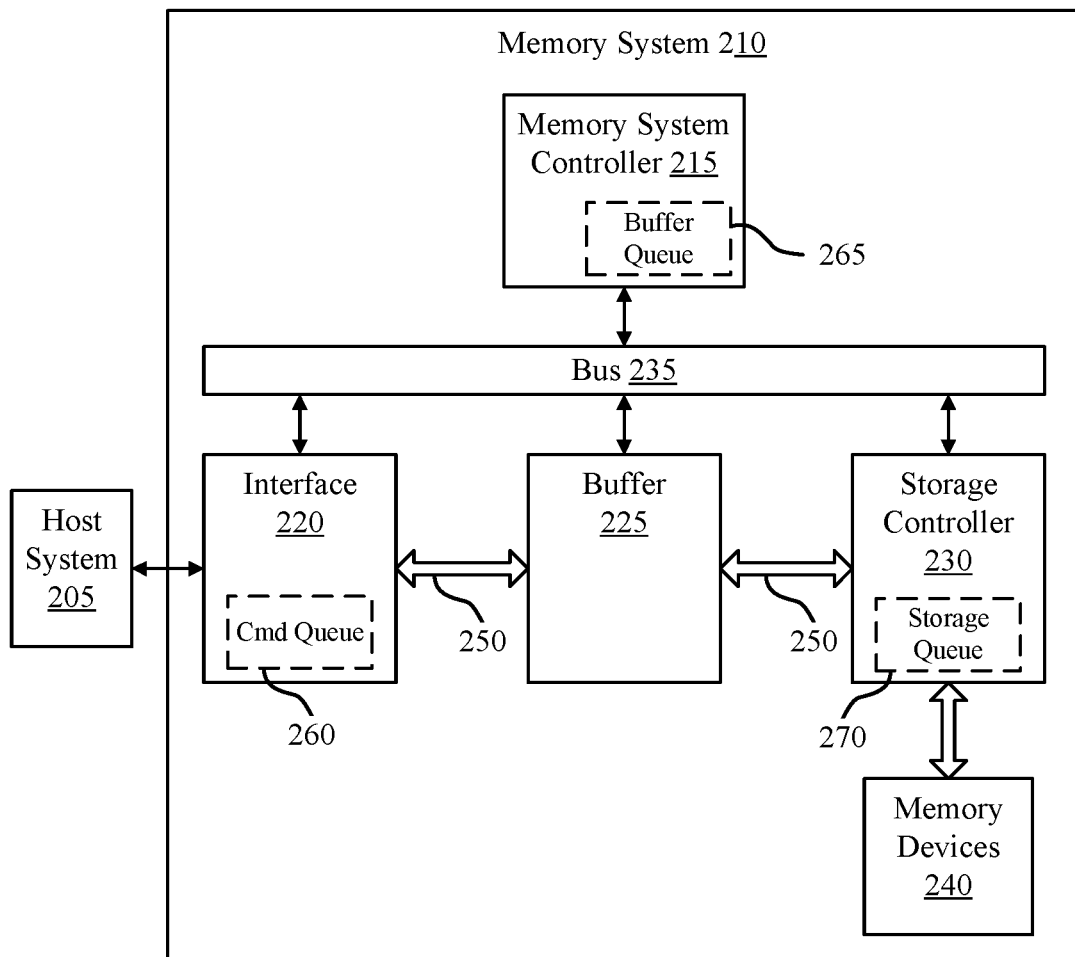
FIG. 2 illustrates an example of a system that supports inserting temperature information into a codeword in accordance with examples as disclosed herein.

Features of the disclosure are initially described in the context of systems, devices, and circuits with reference to FIGS. 1 through 2. Features of the disclosure are described in the context of a system, a controller, and a process flow with reference to FIGS. 3-5. These and other features of the disclosure are further illustrated by and described in the context of an apparatus diagram and flowchart that relate to inserting temperature information into a codeword with reference to FIGS. 6-9.

FIG. 1 illustrates an example of a system 100 that supports inserting temperature information into a codeword in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or any combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support inserting temperature information into a codeword. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may be exposed to or experience temperature fluctuations over time. For example, the temperature of a memory device 130 during a write operation for a set of data may be different than the temperature of the memory device during a read operation for the set of data. Thus, the reading temperature may be different than the programming temperature. The absolute difference (e.g., the magnitude of the difference) between the programming temperature and the reading temperature for a set of data may be referred to herein as the cross temperature difference or the cross temperature variation. If the cross temperature difference is greater than a threshold (e.g., ~50° C.), the memory device 130 may misinterpret the set of data during the read operation (e.g., because the charges representing various logic states may be different for different temperatures). Misinterpreting a set of data may result in errors in the set of data, which in turn may impair performance of the system 100.

According to the techniques described herein, a memory device 130 (or another component of memory system 110) may insert temperature information (e.g., the programming temperature, the reading temperature) for a set of data into the set of data so that a controller (e.g., the memory system controller 115, the host system controller 106) can use the temperature information to adjust one or more settings, such as one or more trim settings for the memory device 130. Trim settings may refer to settings that influence various operations, such as read operations, at the memory device 130 and may include the reference voltage used by the memory device 130 to determine the logic states of memory cells, parameters used by processing circuitry of the memory device 130 to interpret the logic values determined for a set of data, or both, among other examples.

FIG. 2 illustrates an example of a system 200 that supports inserting temperature information into a codeword in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine whether an access command has been received based on or in response to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine whether the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine whether the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, after the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, a memory device (e.g., the memory system 210 or a memory device 240) may insert temperature information into a set of data before (or as part of) writing the set of data to memory. For example, the memory device may insert into a set of data temperature information that represents or includes the programming temperature for the set of data. The memory device may insert the temperature information by replacing bits, such as placeholder bits, in the set of data with the temperature information. In some examples, placeholder bits may be bits with default logic values (e.g., placeholder bits may be bits with logic values set to '0') that do not represent any intended information. If a controller (e.g., a storage controller 230, a memory system controller 215, a controller of the host system 205) requests the set of data, the memory device may read the set of data from memory and return the set of data, including the temperature information, to the controller. In some examples, the set of bits may be a codeword or a bit stream that includes data bits, parity bits, metadata bits, placeholder bits, or any combination thereof. In some examples, the memory device may insert additional temperature information (e.g., the reading temperature) into the set of data before returning the set of data to the controller.

Upon receipt of the set of data the controller may extract the temperature information from the set of data and store the temperature information so that the controller can access the temperature information at a later point in time. As part of the extraction, the controller may effectively replace the temperature information with other bits, such as placeholder bits, (e.g., so that the controller can perform error correction code (ECC) decoding on the set of bits). If the controller determines that the set of bits is unreliable (e.g., has a threshold quantity of errors), the controller may use the stored temperature information to adjust one or more trim settings for the memory device (which may help the memory device compensate for cross-temperature variation). The controller may request that or initiate that (e.g., instruct, cause) the memory device re-read the set of data using the updated trim settings, an operation that may be referred to as a corrective read operation or a recovery read operation in some examples. Thus, the memory device 240 and the controller may work together to mitigate issues caused by differences between programming temperatures and reading temperatures.

Figure 3:
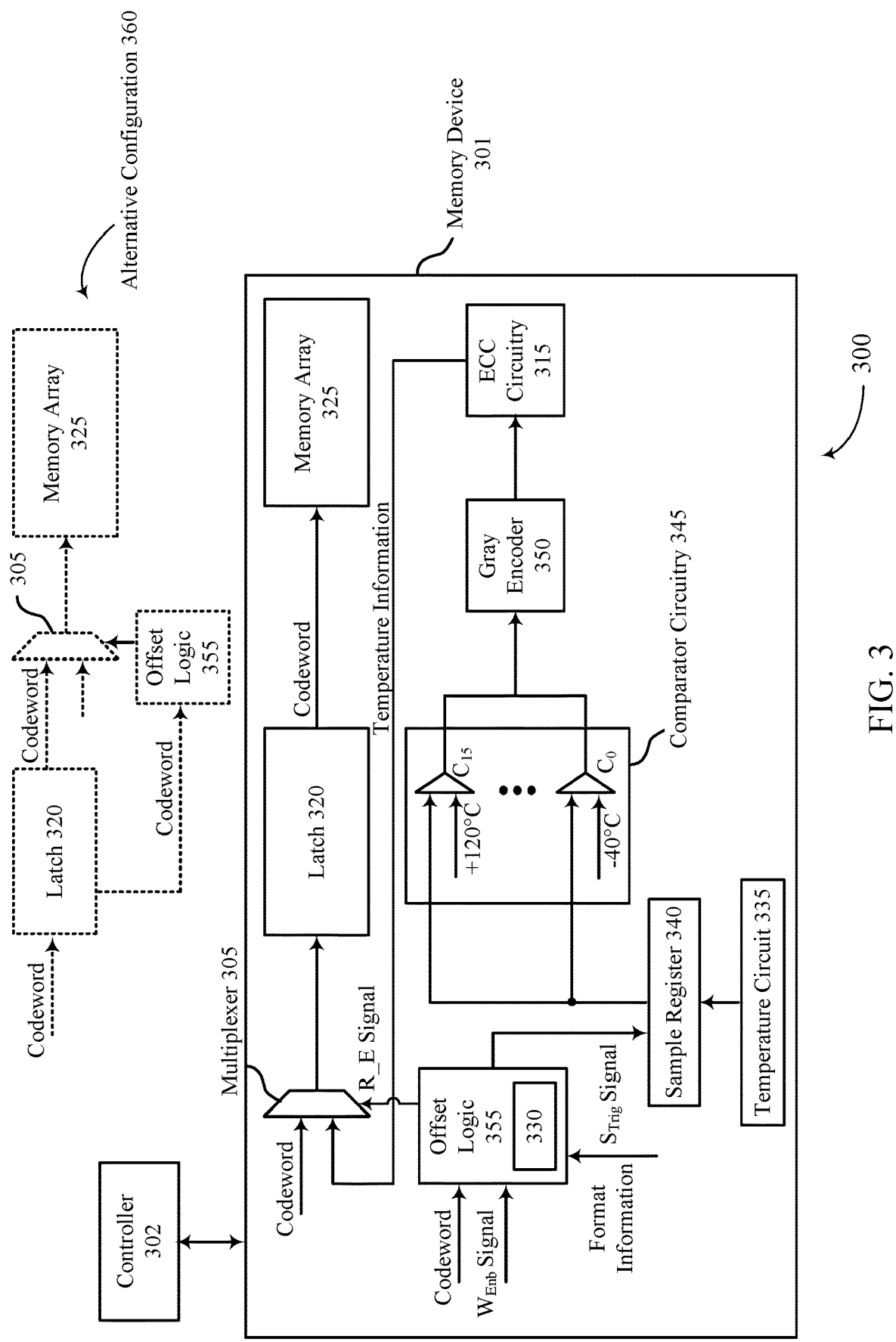
FIG. 3 illustrates an example of a system that supports inserting temperature information into a codeword in accordance with examples as disclosed herein.

FIG. 3 illustrates an example of a system 300 that supports inserting temperature information into a codeword in accordance with examples as disclosed herein. The system 300 may be an example of aspects of the system 100 or the system 200 as described with reference to FIGS. 1 and 2, respectively. The system 300 may include a memory device 301, which may be an example of a memory system 110, a memory device 130-a, a memory system 210, or a memory device 240 as described with herein. The memory device 301 may be coupled with a controller 302 and may be configured to communicate with the controller 302 over one or more buses. The controller 302 may be an example of a host system 105, a host system controller 106, a memory system controller 115, a host system 205, or a memory system controller 215 as described herein.

The memory device 301 may include a multiplexer 305 that is configured to receive codewords from the controller and to replace placeholder bits in the codewords with temperature information (e.g., bits that represent or indicate temperature). Alternatively, the multiplexer 305 may be configured to replace the placeholder bits with temperature codewords that include not only temperature information but also corresponding parity bits for the temperature information (and possibly one or more padding bits, as described below). The multiplexer 305 may be at least partially controlled by the offset logic 355, which may output a control signal (e.g., a digital control signal) referred to as the replacement enable signal (denoted R_E signal in FIG. 3). Thus, the multiplexer 305 may be configured to replace bits, such as placeholder bits, with temperature information based on (or in response to) the replacement enable signal. For example, the multiplexer 305 may be configured to replace placeholder bits with temperature information if the replacement enable signal is set high (e.g., to a logic '1'). The multiplexer 305 may receive the temperature information from the sample register 340, the comparator circuitry 345, the Gray encoder 350, or the ECC circuitry 315. After replacing the bits, such as placeholder bits, with temperature information (or a temperature codeword), the multiplexer 305 may output the codeword to the latch 320, which may be configured to temporarily store the codeword before transferring the codeword to the memory array 325 for storage.

The codewords received by the memory device 301 may include multiple bytes of information and may have a predetermined (e.g., static, fixed) format so that that the memory device 301 is able to determine the contents of each byte. For example, the codewords received by the memory device 301 may each have the same length (e.g., quantity of bytes) referred to as $L_{CW}$. Further, the placeholder bits in each codeword may be one or more of the bits of the nth byte, which may be referred to as the placeholder byte. The length $L_{CW}$ and the placeholder byte position, potentially along with other format information, may be indicated to the memory device 301 by the controller 302.

The offset logic 355 may be configured to control the multiplexer 305 so that the multiplexer 305 replaces the correct bits (e.g., the placeholder bits) of the codeword with the temperature information (or temperature codeword). To do so, the offset logic 355 may reference format information, such as the length $L_{CW}$ and the placeholder byte position, received from the controller 302. For example, the offset logic 355 may be configured to count the bytes of a codeword as the bytes are received by the offset logic 355 (and received at the multiplexer 305). The offset logic 355 and the multiplexer 305 may each be configured to receive bytes of a codeword in a serial manner (e.g., one byte at a time, where a byte is eight bits).

The offset logic 355 may distinguish codeword bytes from noise on the data bus based on (or in response to) the write enable ($W_{Enb}$) signal, which may indicate valid data is on the data bus. Upon detecting that the placeholder byte has been received, the offset logic 355 may output the R_E signal to indicate that the multiplexer 305 should replace the placeholder bits with temperature information (or a temperature codeword). Alternatively, depending on the latency of the system, the offset logic 355 may prompt the multiplexer 305 to replace the placeholder bits upon detecting that a trigger byte (e.g., a predetermined byte that precedes the placeholder byte) has been received. The offset logic 355 may reset the counter for a subsequent codeword based on (e.g., as a function of) the length $L_{CW}$ (e.g., upon counting the last byte of the codeword). In another example, the offset logic 355 may prompt the multiplexer 305 to replace the placeholder bits upon determining that a threshold amount of time has elapsed since the first byte of the codeword was received. In another example, the offset logic 355 may prompt the multiplexer 305 to replace the placeholder bits upon receipt of a control signal from the controller 302.

In some examples, the offset logic 355 may include a clock 330 that the memory device 301 uses to synchronize various aspects and operations of the memory device 301. Thus, the clock 330 may be coupled with one or more components of the memory device 301. Although shown included in the offset logic 355 other configurations of the clock 330 are contemplated and with the scope of the present disclosure.

The temperature information inserted into a codeword may be based on (e.g., a function of) a temperature measured by the temperature circuit 335, which may be configured to output a binary value that represents the temperature of the memory device 301. Because the temperature of the memory device 301 may vary over time, the memory device 301 may include a sample register 340 that is configured to sample the output of the temperature circuit 335 so that a static temperature can be captured for use by the memory device 301. In some examples, the sample register 340 may be configured to sample the output of the temperature circuit 335 in response to a control signal (e.g., the sample trigger ($S_{Trig}$) signal) output by the offset logic 355. For example, the offset logic 355 may output the sample trigger signal upon detecting that a trigger byte (e.g., a predetermined byte that precedes the placeholder byte) has been received.

The sample register 340 may be configured to output the sampled temperature (e.g., as a binary value) to the comparator circuitry 345, which may be configured to indicate a temperature range within which the temperature falls. In some examples, the comparator circuitry 345 may be an example of a ladder comparator or a window comparator.

The comparator circuitry 345 may include multiple comparators. For example, the comparator circuitry 345 may include sixteen comparators denoted $C_0$ through $C_{15}$. Each comparator may be configured to operate on (e.g., compare) the sampled temperature from the sample register 340 and a respective temperature (e.g., represented as a binary value). For example, comparator $C_0$ may be configured to operate on the sampled temperature and the value for −40° C., comparator C1 may be configured to operate on the sampled temperature and the value for −50° C., and so on and so forth.

For a given comparator, if the sampled temperature is greater than the reference temperature, the comparator may output a logic '1;' otherwise the comparator may output a logic '0.' Thus, in some examples, the output of the comparator circuitry 345 may be a sixteen bit binary value (or an x-bit value, where x is the number of comparators) that indicates the range of the sampled temperature. For example, if the sampled temperature is 115° C., each comparator except comparator C15 may output a logic '1.' Thus, the comparator circuitry 345 may indicate that the sampled temperature is between 110° C. and 120° C. by outputting '0111111111111111,' where the most significant bit is the output of comparator $C_{15}$ and the least significant bit is the output of comparator $C_0$.

Given the configuration of the comparator circuitry 345, the possible values output by the comparator circuitry 345 may be limited to a threshold quantity of value (e.g., to sixteen total values). To reduce the quantity of bits used to represent the temperature, the memory device 301 may include an encoder that is configured to map the sixteen bit value to fewer bits. For example, the memory device 301 may include a Gray encoder 350 that is configured to perform encoding, such as Gray encoding, on the sixteen bit binary value output by the comparator circuitry 345. Gray encoding may be a type of coding that ensures that a single bit changes between successive values. So, the Gray encoder 350 may use Gray encoding to translate a sixteen bit value output by the comparator circuitry 345 into a four bit value. However, other types of encoding are contemplated and fall within the scope of the present disclosure.

The ECC circuitry 315 may be configured to perform ECC encoding on the value output by the Gray encoder 350 so that the value is ECC-protected. For example, the ECC circuitry 315 may include encoding circuitry that applies an ECC code to the value output by the Gray encoder 350 so that parity bits can be generated for the value. Thus, the ECC circuitry 315 may be configured to output a set of bits, referred to as a temperature codeword, that includes temperature information bits and parity bits for the temperature information bits. The ECC circuitry 315 may also include decoding circuitry for detecting errors in temperature codewords that are read from the memory array 325. In some examples, the ECC circuitry 315 may be an example of a single-error-correction double-error-detection (SECDED) ECC circuit that is configured to implement ECC techniques that allow the memory device 301 to detect up to two errors and to correct for one error.

In some examples, the ECC circuitry 315 may be configured to append (e.g., add) one or more padding bits (e.g., dummy bits that do not represent any information) to the temperature codeword so that the temperature codeword is the right size for replacing the placeholder bits. For example, the ECC circuitry 315 may be configured to add a padding bit to the temperature codeword so that the temperature codeword is eight bits (e.g., four temperature bits, three parity bits, and one padding bit). Thus, the ECC circuitry 315 may be configured to output a temperature codeword that includes temperature information for the memory device 301, parity bits that protect the temperature information, and possibly one or more padding bits for sizing purposes. Depending on the sampling time, the temperature codeword output by the ECC circuitry 315 may represent the programming temperature for a codeword or the reading temperature for the codeword.

Alternative configurations of the memory device 301 are contemplated and within the scope of the present disclosure. For example, the memory device 301 may be implemented using an alternative configuration 360. In the alternative configuration 360, the multiplexer 305 may be positioned between the latch 320 and the memory array 325. Thus, the offset logic 355 and the multiplexer 305 may receive the codeword directly from the latch 320 (e.g., as opposed to directly from the controller 302). Positioning the multiplexer 305 closer to the memory array 325 may allow the memory device 301 to sample the temperature of the memory device 301 closer in time to a write operation for a codeword than alternative configurations, which may improve the accuracy of the temperature information inserted into the codeword, among other benefits.

Although described with reference to the programming temperature for a codeword, the techniques described herein may be extended to the reading temperature for the codeword and other examples. For example, the memory device 301 may be configured to insert (e.g., via the multiplexer 305 or a second multiplexer) temperature information (or a temperature codeword) that indicates the reading temperature for a codeword in a second set of placeholder bits of the codeword. Thus, the controller 302 may determine the cross temperature variation for the codeword based on (e.g., according to) temperature information that indicates the programming temperature and temperature information that indicates the read temperature. Alternatively, the memory device 301 may communicate to the reading temperature to the controller 302 via one or more control signals. Or, in another example, the controller 302 may use the temperature of the controller 302 (e.g., at issuance of the read command, or upon receipt of the codeword) as the read temperature for codeword.

After communicating a codeword with temperature information to the controller 302, the memory device 301 may receive an indication to update one or more trim parameters for the memory device 301. For example, the memory device 301 may be prompted to access a register of the controller 302 for the values of one or more updated trim parameters. Or the memory device 301 may receive the values of the one or more updated trim parameters in control signaling from the controller 302. The memory device 301 may also receive a command for a recovery read operation for the codeword. Accordingly, the memory device 301 may update the one or more trim parameters and perform the recovery read operation using the updated values for the one or more trim parameters.

Thus, the memory device 301 may be configured to insert temperature information into a codeword received from the controller 302, which may help the system 300 compensate for temperature variations between programming and reading.

Figure 4:
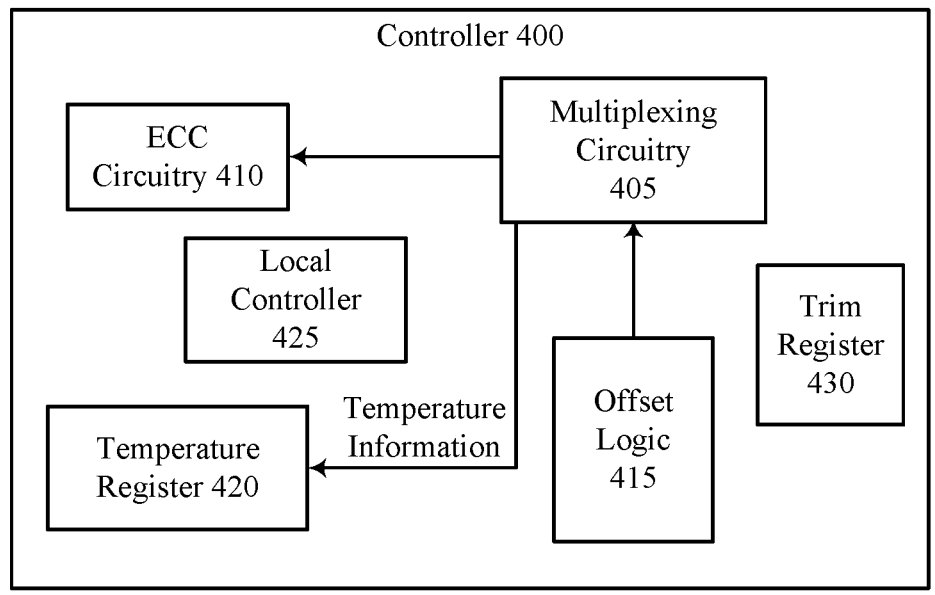
FIG. 4 illustrates an example of a controller that supports inserting temperature information into a codeword in accordance with examples as disclosed herein.

FIG. 4 illustrates an example of a controller 400 that supports inserting temperature information into a codeword in accordance with examples as disclosed herein. The controller 400 may be an example of a host system controller 106, a memory system controller 115, a local controller 135-*a*, or a controller 302 as described herein. Thus, the controller 400 may be coupled with a memory device, such as the memory device 301 described with reference to FIG. 3. The controller 400 may include one or more local controllers 425, which may be configured to control the operations of one or more components of the controller 400.

The controller 400 may include multiplexing circuitry 405, which may include multiplexers, demultiplexers, or both. The multiplexing circuitry 405 may be configured to insert placeholder bits into a data stream that is encoded into a codeword by the ECC circuitry 410. The multiplexing circuitry 405 may be controlled at least partially by the offset logic 415, which may be configured similar to the offset logic 355 as described with reference to FIG. 3. Thus, the controller 400 may communicate to the memory device a codeword that includes placeholder bits in the nth byte of the codeword, where the nth byte is the placeholder byte.

The multiplexing circuitry 405 may also be configured to extract temperature information from codewords received from the memory device. For example, the multiplexing circuitry 405 may be configured to extract temperature information from a received codeword by replacing the temperature information with placeholder bits that match the placeholder bits from the original codeword (e.g., so that ECC decoding can be performed on the codeword). The controller 400 may store the extracted temperature information in temperature register 420 so that the controller 400 can later access the temperature information.

The ECC circuitry 410 may be configured to perform ECC encoding and ECC decoding. For example, the ECC circuitry 410 may include encoding circuitry to generate codewords that have placeholder bits. The ECC circuitry 410 may also include decoding circuitry to detect and correct errors in codewords that have placeholder bits. If the ECC circuitry 410 detects a threshold quantity of errors in a codeword, the controller 400 may determine to perform a recovery read operation for the codeword. For example, the controller 400 may use the temperature information for the codeword to adjust one or more trim settings of the memory device. In some examples, the controller 400 may adjust the trim setting(s) based on (e.g., as a function of) a difference between the programming temperature indicated by the temperature information and a reading temperature associated with the codeword (e.g., based on the cross temperature variation). The reading temperature may be extracted from the codeword, determined from control signaling from the memory device, or determined as the temperature of the controller 400.

The values for the updated trim settings of the memory device may be stored in the trim register 430, which may be accessible by the memory device. Additionally or alternatively, the values for the updated trim setting(s) may be communicated to the memory device via one or more control signals. After updating the trim setting(s), the controller 400 may send a read command to the memory device indicating that the memory device is to perform a recovery read operation for the codeword (e.g., re-read the codeword using the adjusted trim setting(s)).

Thus, the controller 400 may use temperature information inserted into a codeword to update trim setting(s) for a recovery read operation for the codeword, which may reduce errors associated with cross temperature variation.

Figure 5:
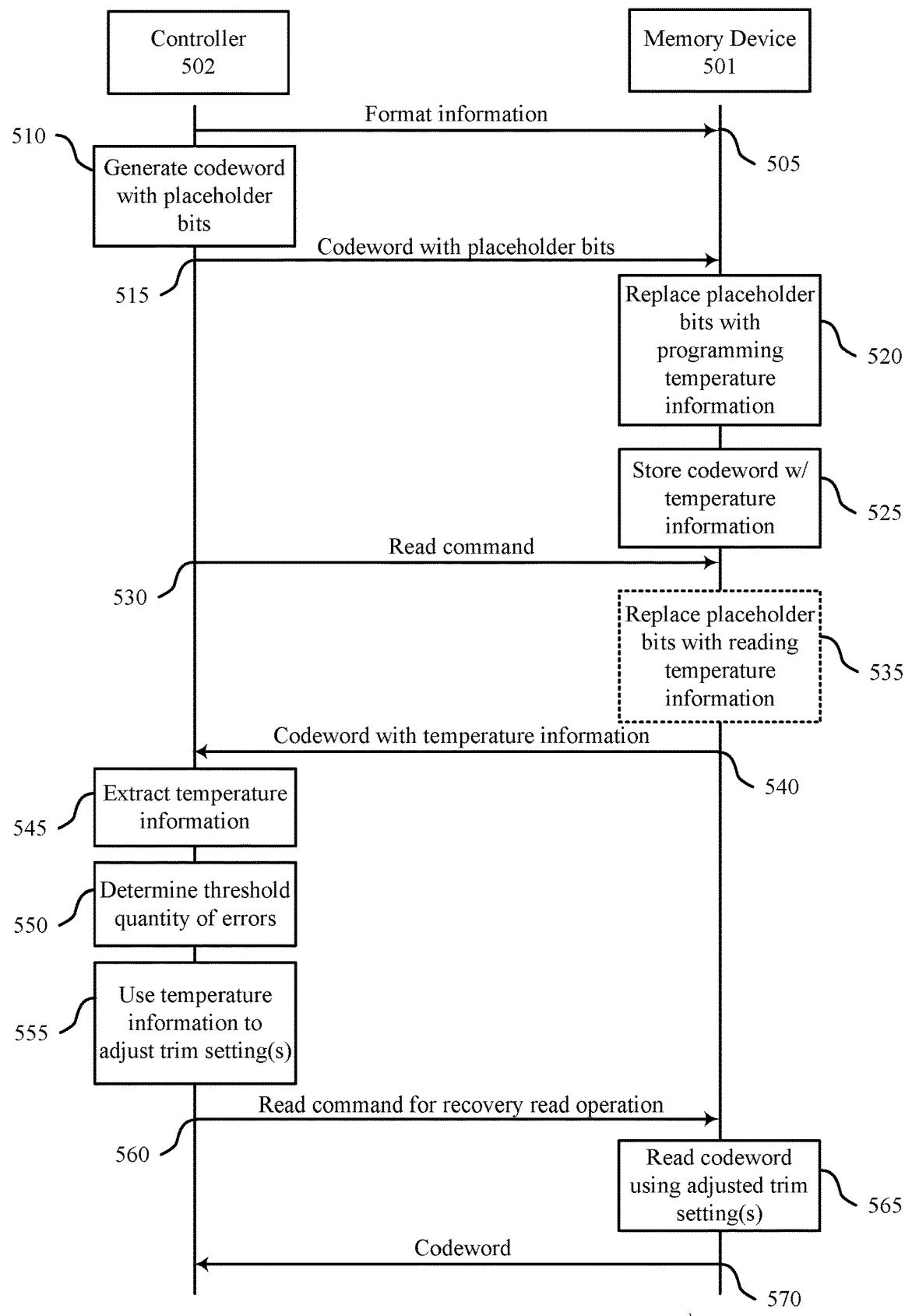
FIG. 5 illustrates an example of a process flow that supports inserting temperature information into a codeword in accordance with examples as disclosed herein.

FIG. 5 illustrates an example of a process flow 500 that supports inserting temperature information into a codeword in accordance with examples as disclosed herein. The process flow 500 may be implemented by a memory device 501 and a controller 502. The memory device 501 may be an example of a memory device 130-a, a memory device 240, or a memory device 301 as described herein. The controller 502 may be an example of a host system controller 106, a memory system controller 115, a local controller 135-a, a controller 302, or a controller 400 as described herein. The memory device 501 may insert in a codeword temperature information that the controller 502 can use to adjust one or more trim settings for the memory device 501.

Aspects of the process flow 500 may be implemented by one or more locals controller, among other components. Additionally or alternatively, aspects of the process flow 500 may be implemented as instructions stored in memory (e.g., firmware stored in a memory coupled with the controller 502 or the memory device 501). For example, the instructions, when executed by a local controller, may cause the local controller to perform the operations of the process flow 500.

At 505, format information for a codeword may be indicated. For example, the controller 502 may send an indication of codeword format information to the memory device 501. For instance, the controller 502 may indicate the length $L_{CW}$ for codewords and the placeholder byte position(s) for temperature information (e.g., programming temperature information, reading temperature information). At 510, a codeword with placeholder bits may be generated. For example, the controller 502 may generate a codeword with placeholder bits. For instance, the controller 502 may generate a codeword with a first set of placeholder bits for programming temperature information, a second set of placeholder bits for reading temperature information, or both.

At 515, the codeword with placeholder bits may be communicated. For example, the controller 502 may communicate the codeword with the placeholder bits to the memory device 501. The controller 502 may also communicate a write command associated with the codeword to initiate a write operation for the codeword.

At 520, placeholder bits of the codeword may be replaced with temperature information. For example, the memory device 501 may replace placeholder bits of the codeword with temperature information or a temperature codeword. For instance, the memory device 501 may replace a first set of placeholder bits with a temperature codeword that includes programming temperature information and parity bits. Inserting temperature information (which is unprotected by ECC) may use fewer bits than inserting a temperature codeword; but inserting a temperature codeword may provide more reliability than inserting unprotected temperature information. At 525, the codeword with temperature information may be stored. For example, the memory device 501 may store the codeword in a memory array (e.g., in response to the write command received at 515).

At 530, a read command for the codeword may be communicated. For example, the controller 502 may communicate to the memory device 501 a read command indicating that the memory device 501 is to read the codeword. In response to the read command, the memory device 501 may read the codeword from the memory array. In some examples, the memory device 501 may perform ECC decoding on the temperature codeword in the codeword and correct any errors detected in the temperature codeword.

In some examples, the memory device 501 may, at 535, replace placeholder bits with temperature information. For example, the memory device 501 may replace a second set of placeholder bits with reading temperature information and possibly parity bits for the reading temperature information.

At 540, the codeword with temperature information may be communicated. For example, the memory device 501 may communicate the codeword with the temperature information to the controller 502. The memory device 501 may communicate the codeword based on (or in response to) the read command received at 530.

At 545, temperature information may be extracted from the codeword. For example, the controller 502 may extract temperature information from the codeword received at 540. For instance, the controller 502 may replace the programming temperature codeword with placeholder bits that match the first set of placeholder bits. In some examples, the controller 502 may also replace (e.g., exchange, swap) the reading temperature codeword with placeholder bits that match the second set of placeholder bits. The controller 502 may store the extracted temperature information in a register or other local storage device.

At 550, a threshold quantity of errors may be determined. For example, the controller 502 may determine whether the codeword has a threshold quantity errors (e.g., one error, two errors). The controller 502 may determine that the codeword has the threshold quantity of errors by performing ECC decoding on the codeword (with the placeholder bits in place of the temperature information or temperature codeword(s)). At 555, the temperature information may be used to adjust one or more trim settings. For example, the controller 502 may use the temperature information from the codeword to adjust (e.g., modify) one or more trim settings of the memory device 501. For instance, the controller 502 may adjust the values of one or more trim setting(s) based on (e.g., as a function of) the cross temperature variation for the codeword, which the controller 502 may calculate using the programming temperature information and the reading temperature information for the codeword. The controller 502 may indicate the values of the adjusted trim setting(s) by storing the values in a register accessible by the memory device 501 or by communicating the values to the memory device 501 via control signaling.

At 560, a read command for the codeword may be communicated. For example, the controller 502 may send a read command for the codeword after indicating the adjusted trim setting(s) to the memory device 501. Put another way, the controller 502 may send an indication that the memory device 501 is to perform a recovery read operation using the adjusted trim settings. At 565, the codeword may be read from memory using the one or more adjusted trim settings. For example, the memory device 501 may read the codeword from the memory array in response to the read command and using the adjusted trim setting(s) (e.g., the memory device 501 may perform a recovery read operation for the codeword). At 570, the codeword (possibly with temperature information) may be communicated. For example, the memory device 501 may communicate the codeword to the controller 502.

Thus, the controller 502 and the memory device 501 may use temperature information to implement a recovery read operation that compensates for cross temperature variation.

Figure 6:
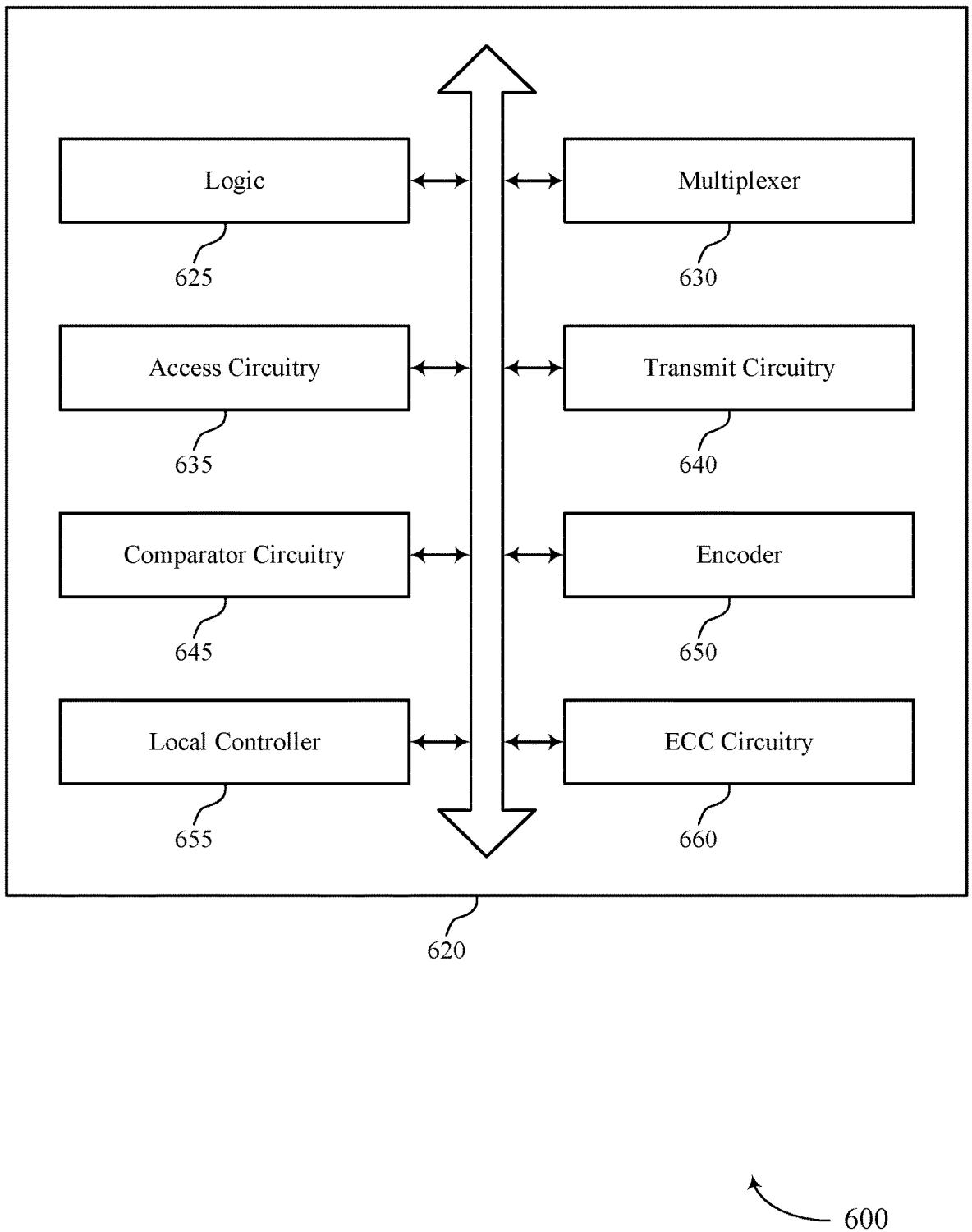
FIG. 6 shows a block diagram of a memory system that supports inserting temperature information into a codeword in accordance with examples as disclosed herein.

FIG. 6 shows a block diagram 600 of a memory system 620 that supports inserting temperature information into a codeword in accordance with examples as disclosed herein. The memory system 620 may be an example of aspects of a memory system as described with reference to FIGS. 1 through 5. The memory system 620, or various components thereof, may be an example of means for performing various aspects of inserting temperature information into a codeword as described herein. For example, the memory system 620 may include a logic 625, a multiplexer 630, an access circuitry 635, a transmit circuitry 640, a comparator circuitry 645, an encoder 650, a local controller 655, a ECC circuitry 660, or any combination thereof. Each of these components may communicate, directly or indirectly, with one another (e.g., via one or more buses).

The logic 625 may be configured as or otherwise support a means for determining that a predetermined set of bits of a codeword has been received. The multiplexer 630 may be configured as or otherwise support a means for replacing, based at least in part on the determination, bits of the codeword with temperature information that indicates a temperature of the memory system. The access circuitry 635 may be configured as or otherwise support a means for storing the codeword including the temperature information in a memory array.

In some examples, the bits of the codeword include the predetermined set of bits or a set of bits received by the memory system after the predetermined set of bits is received by the memory system.

In some examples, the access circuitry 635 may be configured as or otherwise support a means for reading the codeword including the temperature information from the memory array based at least in part on a read command from a controller. In some examples, the transmit circuitry 640 may be configured as or otherwise support a means for communicating the codeword including the temperature information to the controller based at least in part on reading the codeword.

In some examples, the local controller 655 may be configured as or otherwise support a means for updating one or more trim settings for the memory system based at least in part on communicating the codeword including the temperature information to the controller. In some examples, the access circuitry 635 may be configured as or otherwise support a means for re-reading the codeword including temperature information from the memory array after updating the one or more trim settings and based at least in part on a second read command.

In some examples, the logic 625 may be configured as or otherwise support a means for determining that a threshold quantity of bytes of the codeword has been received, where the determination that the predetermined set of bits has been received is based at least in part on determining that the threshold quantity of bytes of the codeword has been received.

In some examples, the logic 625 may be configured as or otherwise support a means for determining that a threshold duration has elapsed since receiving an initial byte of the codeword, where the determination that the predetermined set of bits has been received is based at least in part on determining that the threshold duration has elapsed.

In some examples, the comparator circuitry 645 may be configured as or otherwise support a means for comparing an output value from a temperature circuit with a set of reference values representing different temperatures. In some examples, the comparator circuitry 645 may be configured as or otherwise support a means for determining, based at least in part on the comparisons, a temperature range within which the temperature of the memory system falls, where the temperature information indicates the temperature range.

In some examples, the comparator circuitry 645 may be configured as or otherwise support a means for determining a temperature range within which the temperature of the memory system falls, where the temperature range is represented by a first multi-bit value. In some examples, the encoder 650 may be configured as or otherwise support a means for encoding the first multi-bit value to a second multi-bit value with fewer bits than the first multi-bit value, where the temperature information includes the second multi-bit value.

In some examples, the ECC circuitry 660 may be configured as or otherwise support a means for performing ECC encoding on the second multi-bit value. In some examples, the multiplexer 630 may be configured as or otherwise support a means for replacing additional bits of the codeword with parity bits generated from the ECC encoding.

Figure 7:
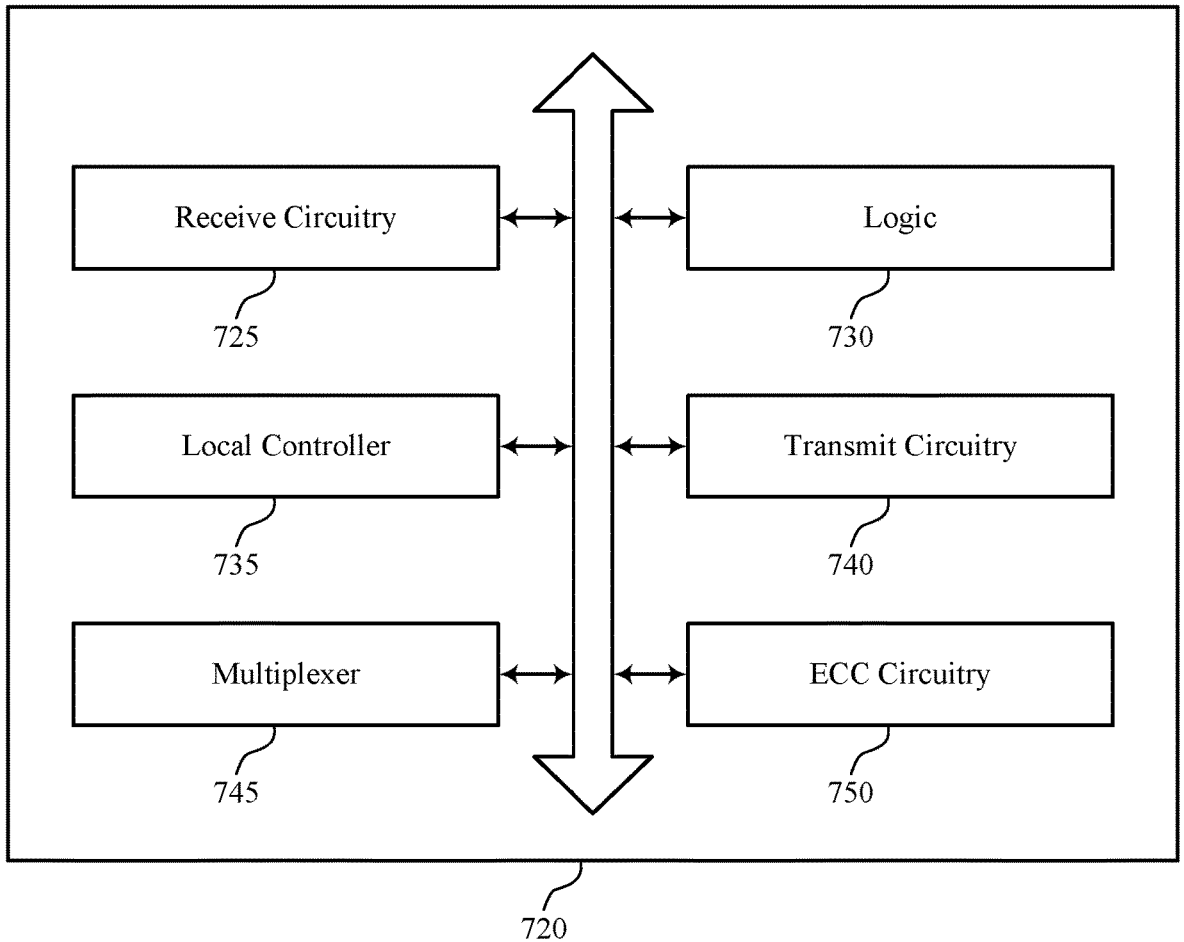
FIG. 7 shows a block diagram of a controller that supports inserting temperature information into a codeword in accordance with examples as disclosed herein.

FIG. 7 shows a block diagram 700 of a controller 720 that supports inserting temperature information into a codeword in accordance with examples as disclosed herein. The controller 720 may be an example of aspects of a controller as described with reference to FIGS. 1 through 5. The controller 720, or various components thereof, may be an example of means for performing various aspects of inserting temperature information into a codeword as described herein. For example, the controller 720 may include a receive circuitry 725, a logic 730, a local controller 735, a transmit circuitry 740, a multiplexer 745, a ECC circuitry 750, or any combination thereof. Each of these components may communicate, directly or indirectly, with one another (e.g., via one or more buses).

The receive circuitry 725 may be configured as or otherwise support a means for receiving a codeword including temperature information about a memory system that is coupled with the controller. The logic 730 may be configured as or otherwise support a means for determining that the codeword includes a threshold quantity of one or more errors. The local controller 735 may be configured as or otherwise support a means for adjusting, based at least in part on the determination, one or more trim settings for the memory system based at least in part on the temperature information. The transmit circuitry 740 may be configured as or otherwise support a means for sending an indication to the memory system that the memory system is to perform a read operation for the codeword based at least in part on adjusting the one or more trim settings.

In some examples, the multiplexer 745 may be configured as or otherwise support a means for replacing the temperature information with bits. In some examples, the local controller 735 may be configured as or otherwise support a means for storing the temperature information in a register of the controller.

In some examples, the ECC circuitry 750 may be configured as or otherwise support a means for performing ECC decoding on the codeword after replacing the temperature information with the bits, where determining that the codeword includes the threshold quantity of one or more errors is based at least in part on performing the ECC decoding.

In some examples, the transmit circuitry 740 may be configured as or otherwise support a means for communicating, to the memory system for a write operation, the codeword with bits, where receiving the codeword includes receiving the codeword with the temperature information in place of the bits.

In some examples, the transmit circuitry 740 may be configured as or otherwise support a means for sending an indication of a position of the bits to the memory system before communicating the codeword with the bits. In some examples, the transmit circuitry 740 may be configured as or otherwise support a means for sending an indication of a length of the codeword before communicating the codeword with the bits.

Figure 8:
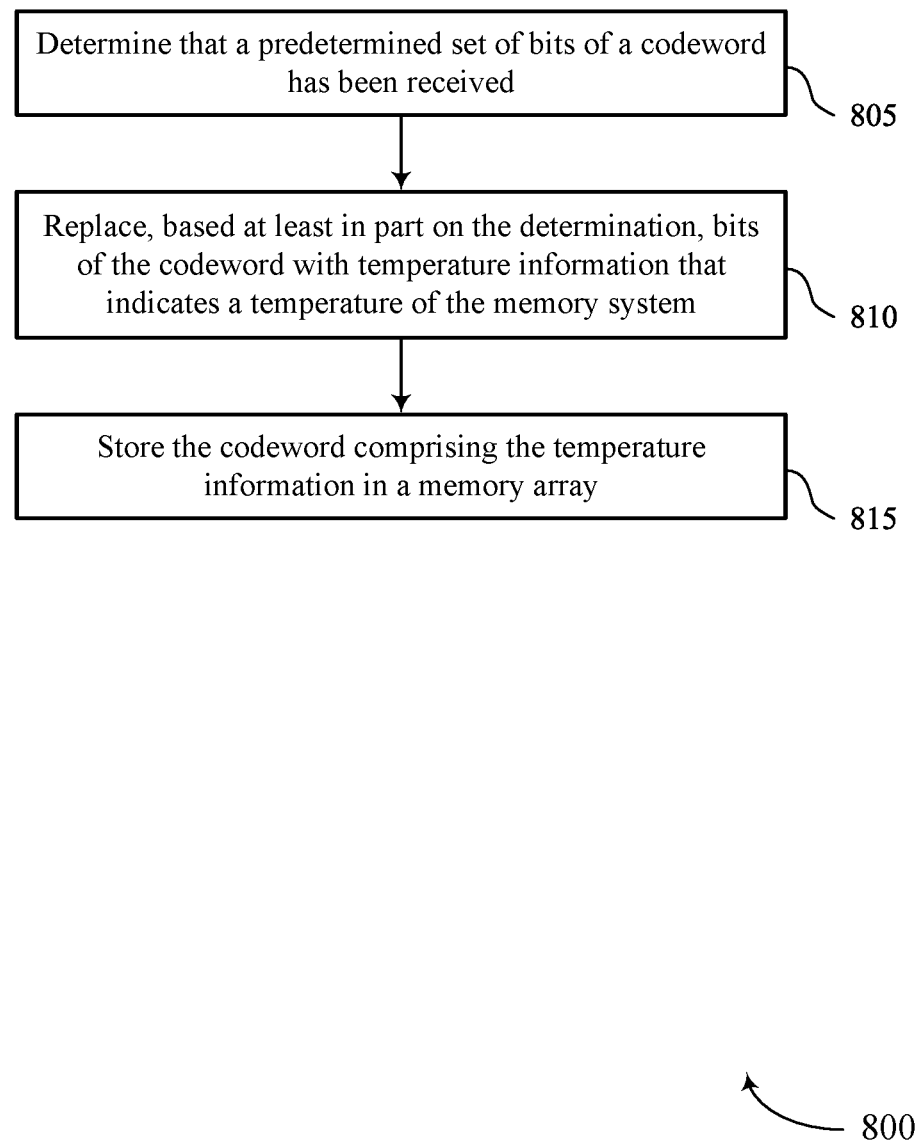
FIGS. 8 and 9 show flowcharts illustrating a method or methods that support inserting temperature information into a codeword in accordance with examples as disclosed herein.

FIG. 8 shows a flowchart illustrating a method 800 that supports inserting temperature information into a codeword in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally or alternatively, the memory system may perform aspects of the described functions using special-purpose hardware.

At 805, the method may include determining that a predetermined set of bits of a codeword has been received. The operations of 805 may be performed in accordance with examples as disclosed herein. In some examples, aspects of the operations of 805 may be performed by a logic 625 as described with reference to FIG. 6.

At 810, the method may include replacing, based at least in part on the determination, bits of the codeword with temperature information that indicates a temperature of the memory system. The operations of 810 may be performed in accordance with examples as disclosed herein. In some examples, aspects of the operations of 810 may be performed by a multiplexer 630 as described with reference to FIG. 6.

At 815, the method may include storing the codeword including the temperature information in a memory array. The operations of 815 may be performed in accordance with examples as disclosed herein. In some examples, aspects of the operations of 815 may be performed by an access circuitry 635 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for determining that a predetermined set of bits of a codeword has been received; replacing, based at least in part on the determination, bits of the codeword with temperature information that indicates a temperature of the memory system; and storing the codeword including the temperature information in a memory array.

Aspect 2: The apparatus of aspect 1, further including operations, features, circuitry, logic, means, or instructions, or any combination thereof for the bits of the codeword include the predetermined set of bits or a set of bits received by the memory system after the predetermined set of bits is received by the memory system.

Aspect 3: The apparatus of any of aspects 1 through 2, further including operations, features, circuitry, logic, means, or instructions, or any combination thereof for reading the codeword including the temperature information from the memory array based at least in part on a read command from a controller and communicating the codeword including the temperature information to the controller based at least in part on reading the codeword.

Aspect 4: The apparatus of aspect 3, further including operations, features, circuitry, logic, means, or instructions, or any combination thereof for updating one or more trim settings for the memory system based at least in part on communicating the codeword including the temperature information to the controller and re-reading the codeword including temperature information from the memory array after updating the one or more trim settings and based at least in part on a second read command.

Aspect 5: The apparatus of any of aspects 1 through 4, further including operations, features, circuitry, logic, means, or instructions, or any combination thereof for determining that a threshold quantity of bytes of the codeword has been received, where the determination that the predetermined set of bits has been received is based at least in part on determining that the threshold quantity of bytes of the codeword has been received.

Aspect 6: The apparatus of any of aspects 1 through 5, further including operations, features, circuitry, logic, means, or instructions, or any combination thereof for determining that a threshold duration has elapsed since receiving an initial byte of the codeword, where the determination that the predetermined set of bits has been received is based at least in part on determining that the threshold duration has elapsed.

Aspect 7: The apparatus of any of aspects 1 through 6, further including operations, features, circuitry, logic, means, or instructions, or any combination thereof for comparing an output value from a temperature circuit with a set of reference values representing different temperatures and determining, based at least in part on the comparisons, a temperature range within which the temperature of the memory system falls, where the temperature information indicates the temperature range.

Aspect 8: The apparatus of any of aspects 1 through 7, further including operations, features, circuitry, logic, means, or instructions, or any combination thereof for determining a temperature range within which the temperature of the memory system falls, where the temperature range is represented by a first multi-bit value and encoding the first multi-bit value to a second multi-bit value with fewer bits than the first multi-bit value, where the temperature information includes the second multi-bit value.

Aspect 9: The apparatus of aspect 8, further including operations, features, circuitry, logic, means, or instructions, or any combination thereof for performing ECC encoding on the second multi-bit value and replacing additional bits of the codeword with parity bits generated from the ECC encoding.

Figure 9:
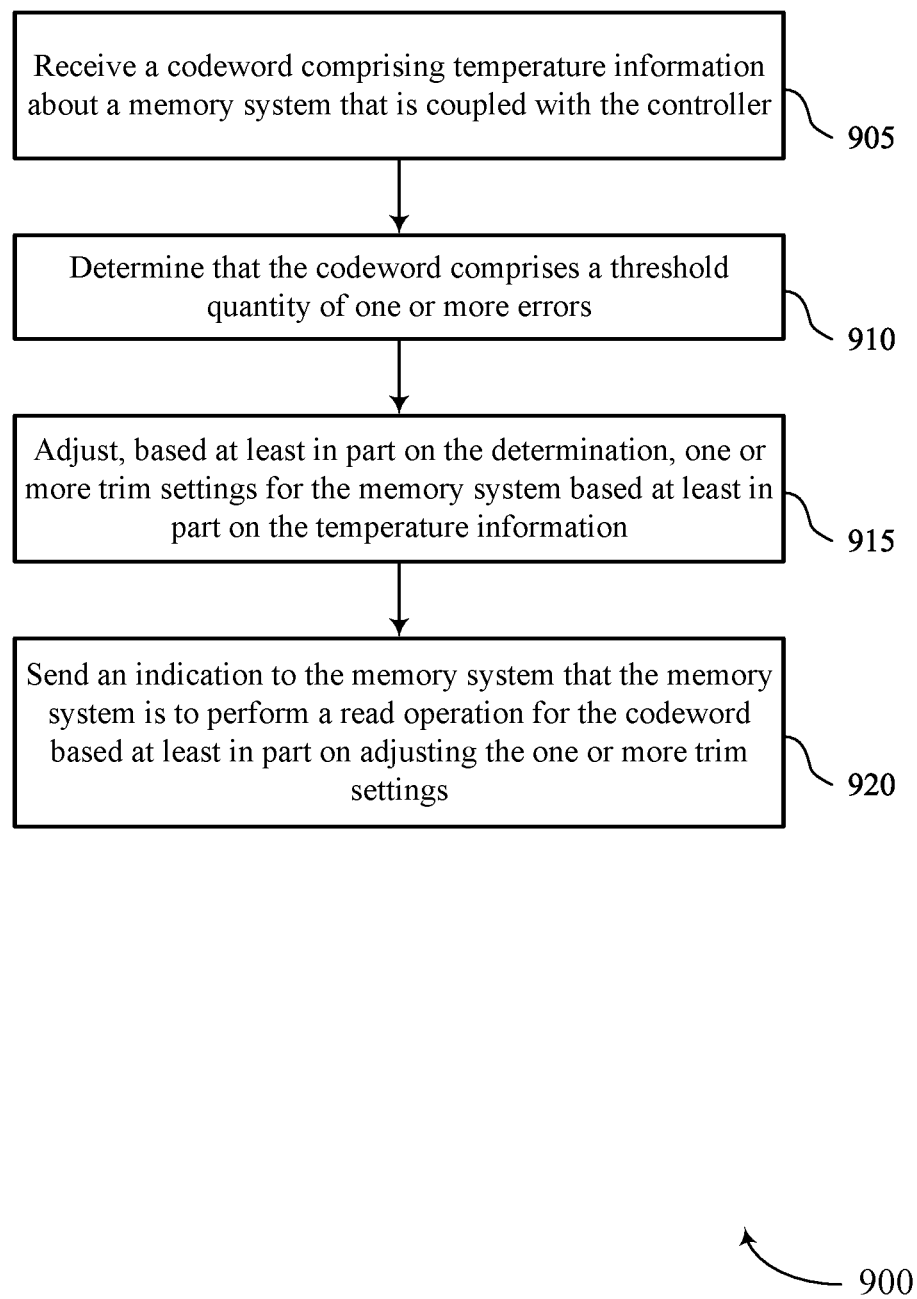

FIG. 9 shows a flowchart illustrating a method 900 that supports inserting temperature information into a codeword in accordance with examples as disclosed herein. The operations of method 900 may be implemented by a controller or its components as described herein. For example, the operations of method 900 may be performed by a controller as described with reference to FIGS. 1 through 5 and 7. In some examples, a controller may execute a set of instructions to control the functional elements of the device to perform the described functions. Additionally or alternatively, the controller may perform aspects of the described functions using special-purpose hardware.

At 905, the method may include receiving a codeword including temperature information about a memory system that is coupled with the controller. The operations of 905 may be performed in accordance with examples as disclosed herein. In some examples, aspects of the operations of 905 may be performed by a receive circuitry 725 as described with reference to FIG. 7.

At 910, the method may include determining that the codeword includes a threshold quantity of one or more errors. The operations of 910 may be performed in accordance with examples as disclosed herein. In some examples, aspects of the operations of 910 may be performed by a logic 730 as described with reference to FIG. 7.

At 915, the method may include adjusting, based at least in part on the determination, one or more trim settings for the memory system based at least in part on the temperature information. The operations of 915 may be performed in accordance with examples as disclosed herein. In some examples, aspects of the operations of 915 may be performed by a local controller 735 as described with reference to FIG. 7.

At 920, the method may include sending an indication to the memory system that the memory system is to perform a read operation for the codeword based at least in part on adjusting the one or more trim settings. The operations of 920 may be performed in accordance with examples as disclosed herein. In some examples, aspects of the operations of 920 may be performed by a transmit circuitry 740 as described with reference to FIG. 7.

In some examples, an apparatus as described herein may perform a method or methods, such as the method 900. The apparatus may include, features, circuitry, logic, means, or instructions (e.g., a non-transitory computer-readable medium storing instructions executable by a processor), or any combination thereof for performing the following aspects of the present disclosure:

Aspect 10: The apparatus, including features, circuitry, logic, means, or instructions, or any combination thereof for receiving a codeword including temperature information about a memory system that is coupled with the controller; determining that the codeword includes a threshold quantity of one or more errors; adjusting, based at least in part on the determination, one or more trim settings for the memory system based at least in part on the temperature information; and sending an indication to the memory system that the memory system is to perform a read operation for the codeword based at least in part on adjusting the one or more trim settings.

Aspect 11: The apparatus of aspect 10, further including operations, features, circuitry, logic, means, or instructions, or any combination thereof for replacing the temperature information with bits and storing the temperature information in a register of the controller.

Aspect 12: The apparatus of aspect 11, further including operations, features, circuitry, logic, means, or instructions, or any combination thereof for performing ECC decoding on the codeword after replacing the temperature information with the bits, where determining that the codeword includes the threshold quantity of one or more errors is based at least in part on performing the ECC decoding.

Aspect 13: The apparatus of any of aspects 10 through 12, further including operations, features, circuitry, logic, means, or instructions, or any combination thereof for communicating, to the memory system for a write operation, the codeword with bits, where receiving the codeword includes receiving the codeword with the temperature information in place of the bits.

Aspect 14: The apparatus of aspect 13, further including operations, features, circuitry, logic, means, or instructions, or any combination thereof for sending an indication of a position of the bits to the memory system before communicating the codeword with the bits and sending an indication of a length of the codeword before communicating the codeword with the bits.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 15: A memory system, including: a logic circuit configured to determine that a predetermined set of bits of a codeword has been received and to output a control signal based at least in part on the determination; a multiplexer configured to receive the codeword and temperature information about the memory system and to replace bits of the codeword with the temperature information based at least in part on the control signal; and a memory array configured to store the codeword including the temperature information.

Aspect 16: The memory system of aspect 15, where the bits of the codeword include the predetermined set of bits or a set of bits received after the predetermined set of bits.

Aspect 17: The memory system of any of aspects 15 through 16, where the logic circuit is configured to receive an indication of a position of the predetermined set of bits within the codeword, and the predetermined set of bits occupies the position within the codeword.

Aspect 18: The memory system of any of aspects 15 through 17, where the logic circuit is configured to determine that the predetermined set of bits has been received based at least in part on a quantity of bytes of the codeword received by the logic circuit.

Aspect 19: The memory system of any of aspects 15 through 18, where the logic circuit is configured to determine that the predetermined set of bits has been received based at least in part on a duration that has elapsed relative to receipt of a first byte of the codeword.

Aspect 20: The memory system of any of aspects 15 through 19, further including: a register coupled with a temperature circuit, where the logic circuit is configured to initiate the register to sample an output of the temperature circuit based at least in part the determination that the predetermined set of bits has been received, and where the temperature information is based at least in part on the sampled output of the temperature circuit.

Aspect 21: The memory system of any of aspects 15 through 20, further including: a set of one or more comparators configured to determine a temperature range for the memory system, where the temperature information represents the temperature range.

Aspect 22: The memory system of any of aspects 15 through 21, further including: circuitry configured to output a set of bits that represent a temperature of the memory system; and an error correction code (ECC) circuit configured to apply ECC encoding to the set of bits, where the multiplexer is configured to replace additional bits of the codeword with a set of parity bits that is based at least in part on the ECC encoding.

Aspect 23: The memory system of any of aspects 15 through 22, further including: a register configured to output a first set of bits that represent a temperature of the memory system; and a set of comparators each coupled with the register and each configured to compare the first set of bits with a respective second set of bits that represent a respective reference temperature, where the temperature information is based at least in part on the comparisons.

Aspect 24: The memory system of aspect 23, where the set of comparators is configured to output, based at least in part on the comparisons, a third set of bits that represent a temperature range, the memory system further including: encoding circuitry coupled with the set of comparators and configured to encode the third set of bits and to output a fourth set of bits with fewer bits than the third set of bits based at least in part on the encoding, where the temperature information includes the fourth set of bits.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and a second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
a logic circuit configured to determine that a predetermined set of bits of a codeword has been received and to output a control signal based at least in part on the determination;
a multiplexer configured to receive the codeword and temperature information about the memory system and to replace bits of the codeword with the temperature information based at least in part on the control signal; and
a memory array configured to store the codeword comprising the temperature information.

2. The memory system of claim 1, wherein the bits of the codeword comprise the predetermined set of bits or a set of bits received after the predetermined set of bits.

3. The memory system of claim 1, wherein the logic circuit is configured to receive an indication of a position of the predetermined set of bits within the codeword, and the predetermined set of bits occupies the position within the codeword.

4. The memory system of claim 1, wherein the logic circuit is configured to determine that the predetermined set of bits has been received based at least in part on a quantity of bytes of the codeword received by the logic circuit.

5. The memory system of claim 1, wherein the logic circuit is configured to determine that the predetermined set of bits has been received based at least in part on a duration that has elapsed relative to receipt of a first byte of the codeword.

6. The memory system of claim 1, further comprising:
a register coupled with a temperature circuit, wherein the logic circuit is configured to initiate the register to sample an output of the temperature circuit based at least in part the determination that the predetermined set of bits has been received, and wherein the temperature information is based at least in part on the sampled output of the temperature circuit.

7. The memory system of claim 1, further comprising:
a set of one or more comparators configured to determine a temperature range for the memory system, wherein the temperature information represents the temperature range.

8. The memory system of claim 1, further comprising:
circuitry configured to output a set of bits that represent a temperature of the memory system; and
an error correction code (ECC) circuit configured to apply ECC encoding to the set of bits, wherein the multiplexer is configured to replace additional bits of the codeword with a set of parity bits that is based at least in part on the ECC encoding.

9. The memory system of claim 1, further comprising:
a register configured to output a first set of bits that represent a temperature of the memory system; and
a set of comparators each coupled with the register and each configured to compare the first set of bits with a respective second set of bits that represent a respective reference temperature, wherein the temperature information is based at least in part on the comparisons.

10. The memory system of claim 9, wherein the set of comparators is configured to output, based at least in part on the comparisons, a third set of bits that represent a temperature range, the memory system further comprising:
encoding circuitry coupled with the set of comparators and configured to encode the third set of bits and to output a fourth set of bits with fewer bits than the third set of bits based at least in part on the encoding, wherein the temperature information comprises the fourth set of bits.

11. A method at a memory system, comprising:
determining that a predetermined set of bits of a codeword has been received;
replacing, based at least in part on the determination, bits of the codeword with temperature information that indicates a temperature of the memory system; and
storing the codeword comprising the temperature information in a memory array.

12. The method of claim 11, wherein the bits of the codeword comprise the predetermined set of bits or a set of bits received by the memory system after the predetermined set of bits is received by the memory system.

13. The method of claim 11, further comprising:
reading the codeword comprising the temperature information from the memory array based at least in part on a read command from a controller; and
communicating the codeword comprising the temperature information to the controller based at least in part on reading the codeword.

14. The method of claim 13, further comprising:
updating one or more trim settings for the memory system based at least in part on communicating the codeword comprising the temperature information to the controller; and
re-reading the codeword comprising temperature information from the memory array after updating the one or more trim settings and based at least in part on a second read command.

15. The method of claim 11, further comprising:
determining that a threshold quantity of bytes of the codeword has been received, wherein the determination that the predetermined set of bits has been received is based at least in part on determining that the threshold quantity of bytes of the codeword has been received.

16. The method of claim 11, further comprising:
determining that a threshold duration has elapsed since receiving an initial byte of the codeword, wherein the determination that the predetermined set of bits has been received is based at least in part on determining that the threshold duration has elapsed.

17. The method of claim 11, further comprising:
comparing an output value from a temperature circuit with a set of reference values representing different temperatures; and
determining, based at least in part on the comparisons, a temperature range within which the temperature of the memory system falls, wherein the temperature information indicates the temperature range.

18. The method of claim 11, further comprising:
determining a temperature range within which the temperature of the memory system falls, wherein the temperature range is represented by a first multi-bit value; and
encoding the first multi-bit value to a second multi-bit value with fewer bits than the first multi-bit value, wherein the temperature information comprises the second multi-bit value.

19. The method of claim 18, further comprising:
performing error correction code (ECC) encoding on the second multi-bit value; and replacing additional bits of the codeword with parity bits generated from the ECC encoding.

\* \* \* \* \*